(12) United States Patent
McClure

(10) Patent No.: US 10,001,156 B2
(45) Date of Patent: Jun. 19, 2018

(54) DYNAMIC SLEEVE INSERT FOR USE WITH A BLIND FASTENER SYSTEM

(75) Inventor: Travis D. McClure, Kirkland, WA (US)

(73) Assignee: Centrix Inc., Kent, WA (US)

( * ) Notice: Subject to any disclaimer, the term of this patent is extended or adjusted under 35 U.S.C. 154(b) by 0 days. days.

(21) Appl. No.: 13/032,636

(22) Filed: Feb. 22, 2011

(65) Prior Publication Data

US 2013/0094921 A1 Apr. 18, 2013

Related U.S. Application Data

(63) Continuation of application No. PCT/US2009/004861, filed on Aug. 24, 2009.

(Continued)

(51) Int. Cl.
*F16B 5/02* (2006.01)
*F16B 13/12* (2006.01)
*F16B 37/04* (2006.01)

(52) U.S. Cl.
CPC ............ *F16B 13/12* (2013.01); *F16B 5/0225* (2013.01); *F16B 37/044* (2013.01); *F16B 37/048* (2013.01)

(58) Field of Classification Search
CPC .............................. F16B 5/0225; F16B 5/0233
(Continued)

(56) References Cited

U.S. PATENT DOCUMENTS 1,851,292 A * 3/1932 Rasmussen ..................... 411/53
1,978,935 A 10/1934 Douglas
(Continued)

FOREIGN PATENT DOCUMENTS

EP 1111255 A2 6/2001
GB 413403 A 7/1934
(Continued)

OTHER PUBLICATIONS

ISA Korean Intellectual Property Office, International Search Report Issued in Application No. PCT/US2009/004861, dated May 7, 2010, WIPO, 4 pages.

(Continued)

*Primary Examiner* — Flemming Saether
(74) *Attorney, Agent, or Firm* — McCoy Russell LLP

(57) ABSTRACT

Methods, articles and systems for off-center, non-destructive association between at least two work pieces using a blind fastener component or system having a first part of a first two part anti-rotation arrangement without deformation or loss of compressive association therebetween, and/or fastening system failure. Article and system embodiments include at least one dynamic sleeve insert having a second part of the first anti-rotation arrangement on an inner surface thereof and a first part of a second anti-rotation arrangement on an outer surface thereof, wherein the inner surface accommodates substantial axial translation of the blind fastener, the first part of the second anti-rotation arrangement is functionally complementary to an auxiliary structure having a second part of the second anti-rotation arrangement, and optionally the second anti-rotation arrangement accommodates greater than nominal lateral translation (shear movement) between the dynamic sleeve insert and the auxiliary structure.

22 Claims, 8 Drawing Sheets

Related U.S. Application Data

(60) Provisional application No. 61/189,783, filed on Aug. 22, 2008.

(58) Field of Classification Search
USPC ....... 411/539, 398, 338, 546, 49–53, 84, 85; 403/3, 4, 61, 75
See application file for complete search history.

(56) References Cited

U.S. PATENT DOCUMENTS

| | | | |
|---|---|---|---|
| 2,370,336 A | | 2/1945 | Wallace |
| 2,379,786 A | | 7/1945 | Bugg et al. |
| 2,649,884 A | * | 8/1953 | Westover ..................... 411/173 |
| 2,775,155 A | | 12/1956 | Tompkins et al. |
| 2,936,015 A | | 5/1960 | Rapata |
| 2,994,242 A | | 8/1961 | Buff et al. |
| 3,469,493 A | | 9/1969 | Fisher |
| 4,929,136 A | | 5/1990 | Mee |
| 5,065,490 A | | 11/1991 | Wivagg et al. |
| 5,244,193 A | * | 9/1993 | Hehr ............................. 269/99 |
| 5,443,526 A | * | 8/1995 | Hoerner ........................ 623/38 |
| 5,704,752 A | | 1/1998 | Logerot |
| 6,013,105 A | * | 1/2000 | Potts ........................ A61F 2/76 623/38 |
| 6,226,952 B1 | * | 5/2001 | Romeu Guardia ............ 52/698 |
| 6,287,044 B1 | | 9/2001 | Huber |
| 6,416,266 B2 | | 7/2002 | Schwarz |
| 6,623,203 B2 | * | 9/2003 | Kreyenborg et al. ...... 403/374.3 |
| 8,075,234 B2 | * | 12/2011 | McClure ........................ 411/71 |
| 8,337,132 B2 | * | 12/2012 | Steffenfauseweh et al. . 411/539 |
| 2004/0056167 A1 | * | 3/2004 | Vogt ...................... F16B 5/0225 248/475.1 |
| 2006/0228171 A1 | | 10/2006 | Kurth et al. |
| 2016/0069066 A1 | * | 3/2016 | Connell ................ F16B 5/0225 52/701 |

FOREIGN PATENT DOCUMENTS

| | | |
|---|---|---|
| GB | 1548964 A | 7/1979 |
| JP | S61143949 U1 | 9/1986 |
| JP | H1151018 A | 2/1999 |
| JP | 2001315642 A | 11/2001 |
| WO | 03069971 A2 | 8/2003 |

OTHER PUBLICATIONS

ISA Korean Intellectual Property Office, Written Opinion Issued in Application No. PCT/US2009/004861, dated May 7, 2010, WIPO, 3 pages.

State Intellectual Property Office of the Peoples Republic of China, Office Action Issued in Application No. 200980139358.X, dated Dec. 5, 2012, 16 pages. (Submitted with Machine Translation).

Japan Patent Office, Office Action Issued in Application No. 2011-523830, dated Sep. 30, 2013, 6 pages. (Submitted with Machine Translation).

European Patent Office, Extended European Search Report Issued in Application No. 09814867.9, dated Aug. 24, 2017, Germany, 4 pages.

* cited by examiner

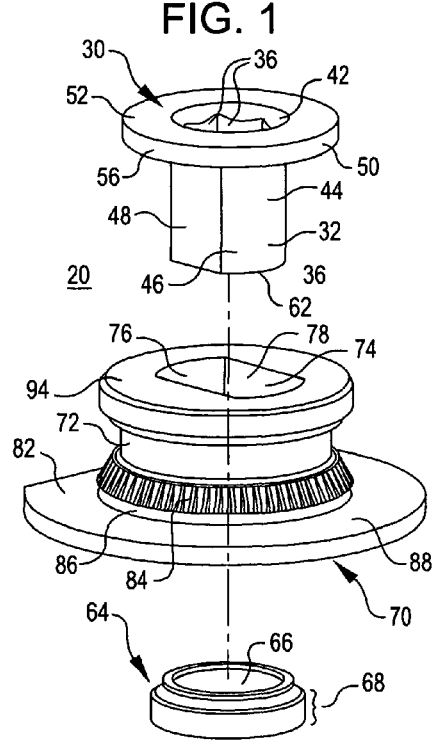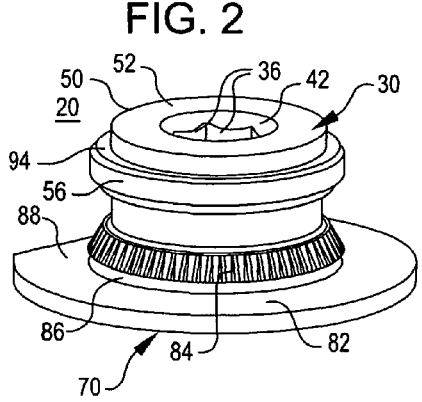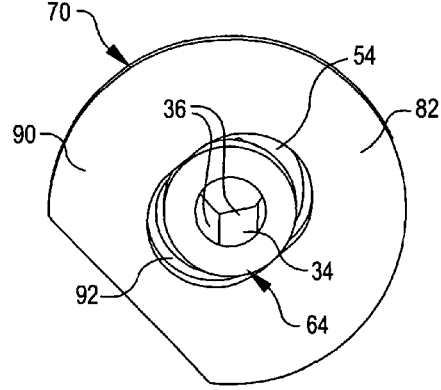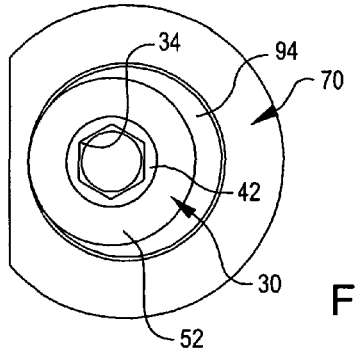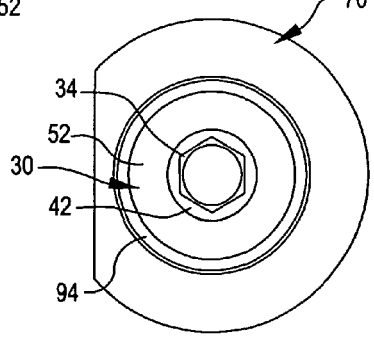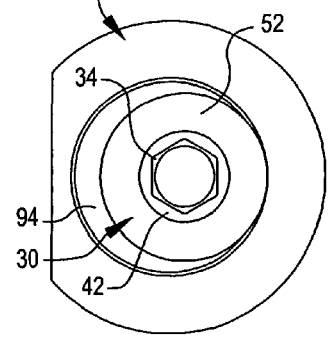

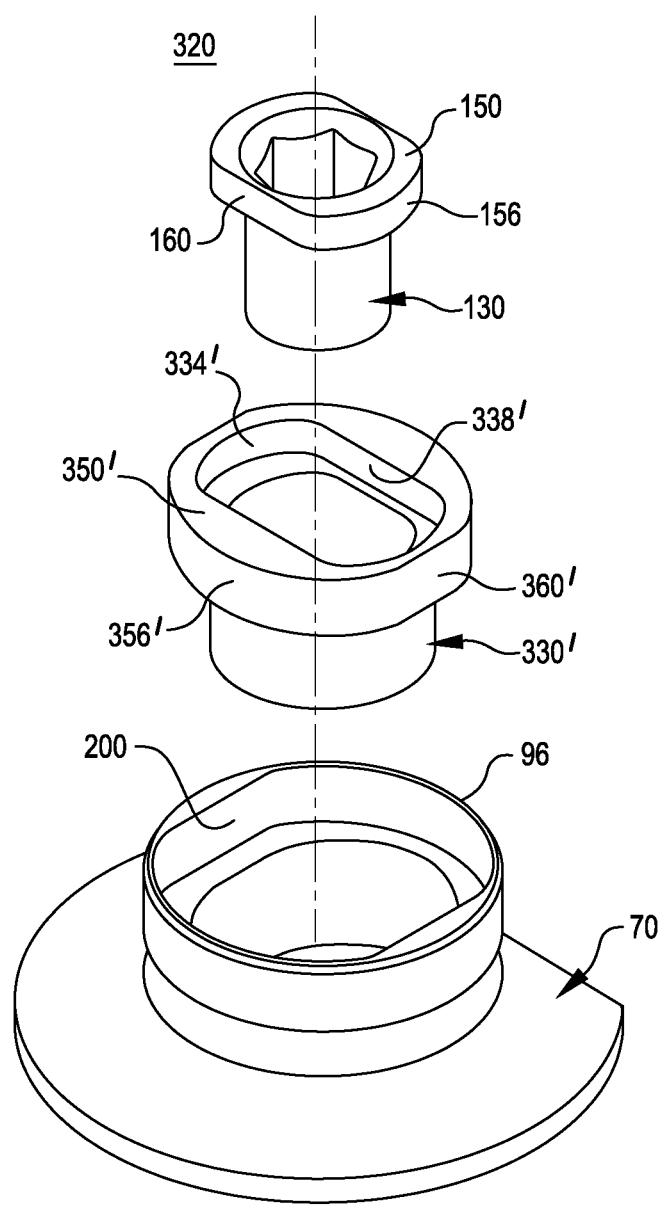

DYNAMIC SLEEVE INSERT FOR USE WITH A BLIND FASTENER SYSTEM

BACKGROUND

A conventional sleeve insert for a blind fastening arrangement according to one aspect of the disclosure found in WO 03/069971 (application number PCT/US03/02925) includes one part of a two part anti-rotation means, one part of a two part anti-translation means, and an upper reactive surface upon which the stud head bears upon when in compression therewith. While it is not necessary, the anti-rotation means and the anti-translation means portions of the sleeve insert usually surround a collet body exterior surface, which possess the complementary parts to the anti-rotation means and the anti-translation means of the sleeve insert. As a consequence, there is a close fit relationship between at least a portion of the collet body and the sleeve insert, which necessarily restricts non-axial movement of the collet body and thus any stud engaged with the collet body (and compressively contacting a work piece). There are instances, however, where relative shear (lateral) movement between closely associated work pieces is desired. Such movement is not possible using the blind fasteners of the prior art insofar as the close fit relationship between at least a portion of the collet body and the sleeve insert prevents such movement, and compression forces generated by the fasteners after clamp-up are directed from opposing surfaces wherein all work pieces are in a state of compression.

SUMMARY OF THE INVENTION

The invention is intended to provide methods, articles and systems for associating, preferably compressively or closely in stacked fashion, at least two work pieces, each work piece defining a bore or hole for receiving an invention embodiment, in combination with a blind fastener component or system comprising a first part of a first two part anti-rotation means. A combination of at least one invention embodiment and such a fastener component and/or system creates a turnkey system that permits off-center assembly of the at least two work pieces and/or constrained lateral or shear movement (movement orthogonal to the axis of the fastening system or the vector of predominant compressive forces) between such work pieces, without negative consequences such as work piece deformation, loss of compressive association there between and/or fastening system failure. The invention embodiments are particularly adapted for use with a blind side collet and collet-stud system of the type disclosed in WO 03/069971, which disclosure is incorporated herein by reference and a summary of which follows.

As used herein and unless otherwise specified, a two part anti-rotation means (hereinafter "ARM") comprises first and second nestable structures movable relative to one another, each structure having one part of the ARM, and each part of which includes at least one reactive surface, although plural reactive surfaces are generally considered desirable for load distribution purposes. During engagement of the two parts, at least one each of the respective reactive surfaces mechanically contact each other to prevent complete, e.g., 360°, rotation of one structure relative to the other structure. In other words, at least one each of the reactive surfaces is configured to constructively contact one another in order to prevent complete rotation between nested structures. While a 1:1 correspondence between complementary reactive surfaces is considered optimal, the ARM only requires that at least one reactive surface from each structure beneficially engage each other. Additional limitations should not be inferred from such configuration: for example, an ARM may permit reciprocation between the first and second structures (either axial and/or lateral) while preventing complete rotation there between.

In many invention embodiments, a blind fastener component or system having a first part of a first two part anti-rotation means comprises a collet body of the type disclosed in WO 03/069971. In relevant part, such collet body comprises a first end engagable with an auxiliary structure such as a sleeve insert or work piece, and a second end including a collet head at or proximate thereto having a maximum external diameter where the second end defines a generally circular opening having a minimum diameter. At or adjacent to the second end is a second wall portion, where the second wall portion has an interior surface and an exterior surface. The second end and/or the exterior surface of the second wall portion comprises a first part of a two part collet ARM for engaging with an auxiliary structure where the auxiliary structure defines a bore, hole, aperture or other opening formed through a section of the auxiliary structure. The bore, hole or aperture has an internal surface geometry adapted to substantially translationally receive the collet body (i.e., nesting), without deformation, and operably function with the first part of the collet ARM to prevent substantial rotation of the collet body therein; this surface geometry comprises the second part of the collet ARM. Exemplary forms of the exterior/interior surface geometries include polygons, splines, tongue(s)/groove(s) or groove(s)/tongue(s) arrangements, slot(s)/key(s) or key(s)/slot(s), and equivalents as appreciated by the skilled practitioner, all of which permit relative axial translation of the first and second ARM parts.

Article and system embodiments of the invention providing for the non-destructive association of at least two work pieces, which permit off-center assembly of the at least two work pieces and/or constrained shear-type movement there between, comprise at least one dynamic sleeve insert having a second part of the first ARM on an inner surface thereof and a first part of a second ARM on an outer surface thereof, wherein the inner surface accommodates substantial translation of a first part of the first ARM, wherein the first part of the second ARM is functionally complementary to an auxiliary structure comprising a second part of the second ARM, and wherein, in certain embodiments, the second ARM accommodates greater than nominal lateral translation (shear movement) between the dynamic sleeve insert and the auxiliary structure after engagement with and/or between the at least two work pieces. Thus, when the at least one dynamic sleeve insert is operatively engaged with the auxiliary structure, unrestricted rotation there between is prevented yet in certain embodiments shear movement there between is permitted; when a fastening system comprising the first part of the first ARM is operatively engaged with the at least one dynamic sleeve insert, unrestricted rotation there between is prevented yet axial translation is not.

Dynamic sleeve inserts according to the invention comprise at least a body portion having an outer surface bounded by a first end and a second end, and that defines a bore having an inner surface and an axis, the body portion being generally, but not necessarily, characterized as a hollow right cylinder having a first geometric cross section orthogonal to the axis thereof. In certain embodiments, a flange portion radially extends from the body portion, preferably at the first end thereof, where a side of the flange portion presenting to the second end of the body portion compressionally contacts the auxiliary structure in one series of embodiments, or is nominally displaced from the auxiliary structure in another series of embodiments, as will be described in greater detail below. The flange portion also includes a peripheral surface and has a geometric cross section orthogonal to the body portion axis.

The inner surface of the dynamic sleeve insert body portion includes surface features comprising a second part of the first ARM, where the first part of the first ARM is present on or in a fastening system to be used in conjunction with the dynamic sleeve insert. In addition to preventing complete rotation of the first part relative to the second part, the second part of the first ARM further comprises complete lateral translation constraining means (hereinafter "CLTCM") whereby all lateral translation (defined as being orthogonal to the dynamic sleeve insert bore axis; also referred to as "shear") there between is substantially prevented. Thus, the first ARM prevents complete rotation of the first part relative to the second part, while the CLTCM prevents greater than nominal lateral translation there between.

As with the collet ARM disclosed in WO 03/069971, a characteristic of the first ARM is its accommodation of axial translation between the first and second parts thereof, i.e., axial translation accommodation means (hereinafter "ATAM"). In other words, the second part of the first ARM accommodates translation of the first part of the first ARM along at least a portion of the inner surface of the dynamic sleeve insert. In certain embodiments, excess axial translation is prevented by translation arresting means, which is also described in greater detail WO 03/069971.

As previously described, the dynamic sleeve insert comprises means to prevent its unrestricted rotation relative to an auxiliary structure when in use, which is referenced herein as the second ARM. This means with respect to the dynamic sleeve insert, in the form of the first part of the second ARM, comprises at least one reactive surface on the outer surface of the body portion and/or the flange portion of the dynamic sleeve insert. While the location(s) of the first part of the second ARM varies considerably between embodiments, a common attribute of such feature is its interaction with the auxiliary structure, which will be described in greater detail below with respect to the second part of the second ARM.

The first part of the second ARM in many invention embodiments comprises at least one feature on the outer surface of the dynamic sleeve insert body portion, and is characterized as having a non-circular cross section, i.e., the distance from the dynamic sleeve insert axis to the outer surface thereof is not constant at every angle. This non-constant radius quality forms a necessary outer surface contour of, and thus a basis for, the first part of the second ARM, at least one portion of which comprises a first reactive surface. Additionally, more than one first part of the second ARM may be present for any given dynamic sleeve insert.

Those persons skilled in the art appreciate that when establishing a reactive surface further from the axis of a rotating body, the force required to achieve a particular torque value in the body is lessened. Consequently, certain embodiments of the invention comprise the previously referenced flange portion, which extends from the body portion of the dynamic sleeve insert, preferably in a radial direction. As noted, the flange portion has a first surface presenting to the environment, a second, opposing surface presenting to the auxiliary structure and a peripheral surface generally corresponding to the sectional thickness of the dynamic sleeve insert flange portion, and in certain embodiments, also corresponding to a feature of the auxiliary structure, as described below. In these invention embodiments, the peripheral surface of the flange portion comprises the at least one reactive surface for the first part of the second ARM (either exclusively or in combination with another structure such as the body portion). Alternative embodiments within this genre provide for projections, such as prongs or tabs, and/or recesses, such as slots or grooves, at the second surface of the flange portion as a first part of the second ARM (again, either exclusively or in combination with another structure such as the body portion). While the flange portion may extend from any segment/portion of the body portion, it preferably extends from the first end of the dynamic sleeve insert.

In addition to its primary function of preventing complete rotation of the dynamic sleeve insert relative to the auxiliary structure, the second ARM permits at least partial axial translation between the first and second parts thereof through ATAM. Thus, the first part of the second ARM is configured to axially translate within the second part of the second ARM present in the auxiliary structure. Moreover, the second ARM also permits lateral translation (shear) between the first and second parts. The structural implications of this second consideration will be best understood after discussing the nature of the second part of the second ARM.

As noted previously, the second part of the second ARM is found in the auxiliary structure, which as will be described in detail below comprises one or more of the work pieces, a static sleeve insert, or a second dynamic sleeve insert. Regardless of second ARM implementation or characterization of the auxiliary structure, invention embodiments are adapted to permit partially constrained temporary or permanent relative lateral translation/shear movement between the dynamic sleeve insert and the auxiliary structure. This functionality is accomplished through the incorporation of partial lateral translation constraining means ("PLTCM"), which may be separate from the second ARM or preferably integrated with the second ARM, depending upon the embodiment. The constitution of the PLTCM will determine whether such movement is constrained to a single line (linear PLTCM embodiments) or a plurality of directions (planar PLTCM embodiments). As with the ARMs described herein, each PLTCM comprises two parts each having reactive surfaces that interact to produce the intended constraints to and allowances of relative movement.

Whether describing linear or planar PLTCM embodiments, temporary relative movement between the dynamic sleeve insert and the auxiliary structure usually occurs prior to and during clamp-up, but not after completion of a clamp-up process; permanent relative movement between the dynamic sleeve insert and the auxiliary structure occurs prior to and during clamp-up as well as after completion of a clamp-up process. Because of this feature of the invention, the second ARM must permit such relative movement, even if it does not comprise the PLTCM. Therefore, the following paragraphs will describe various second ARMs in view of linear and planar PLTCM embodiments. The reader should note that a very high level of structural similarity exists between temporary and permanent relative movement embodiments, the primary difference there between relating to structure not necessarily part of either the second ARM or the PLTCM.

In linear PLTCM embodiments, the auxiliary structure comprises the second part of the second ARM and, by convention, the second part of the linear PLTCM. While the primary function of the second ARM is to limit relative rotation between the second ARM first part, which is associated with the dynamic sleeve insert, and second part, which is associated with the auxiliary structure, it must also accommodate at least bi-directional lateral translation therebetween. As such, there must necessarily be at least one direction of lateral non-constraint there between.

From the perspective of decreasing manufacturing costs, it is preferable, though not necessary, to combine the second ARM function and the linear PLTCM function into a single feature. Thus, in certain invention embodiments wherein the second ARM includes the linear PLTCM, the hole of an auxiliary structure comprises the second part of the second ARM and the linear PLTCM, while in other embodiments, a peripheral rim or recess at or formed by the auxiliary structure comprises the second part of the second ARM. In the first instance, at least a portion of the inner surface of the auxiliary structure that defines the hole constitutes a reactive surface that is a portion of the second part of the second ARM; in the second instance, at least a portion of the inner surface of the peripheral rim/recess of the auxiliary structure constitutes a reactive surface that is portion of the second part of the second ARM.

In linear PLTCM embodiments then, the auxiliary structure hole must permit at least linear translation of the dynamic sleeve insert there within, and may additionally constitute the second part of the second ARM and/or the linear PLTCM. As such, the geometry of the dynamic sleeve insert body portion must be configured to permit such movement within the hole. If the auxiliary body hole is to comprise the second part of the second ARM and/or the linear PLTCM (the dynamic sleeve insert body portion comprising the first part(s)), then geometric congruity between the first and second parts must be maintained as previously described.

Auxiliary Structure Hole Comprises Linear PLTCM:

A common implementation of such configuration is where at least a portion of the hole defined by the auxiliary structure, in cross section orthogonal to the hole axis, has a first transverse dimension ("major axis") greater than an orthogonally oriented second transverse dimension ("minor axis") in the same plane. A pure rectilinear example of such constitution is a rectangle; a pure curvilinear example of such constitution is a non-circular ellipse; a combination of the two will yield a slot geometry. Of course, the skilled practitioner will appreciate that combinations of these two forms are within the scope of the invention. In such a configuration, the sides bounding the minor axis comprise the primary reactive surfaces of the linear PLTCM when the minimum dimension between diametrically opposed external surfaces of the dynamic sleeve insert body portion is nominally less than the minor axis dimension and the body portion otherwise has complementary surface characteristics, e.g., planar (any dimension less than nominal will permit multi-axis or planar movement, which is addressed separately below). A benefit of such embodiments is that if the body portion is anything but circular, then the opposing surfaces of the hole function as the second part of the second ARM while the complementary surfaces of the body portion constitute the first part of the second ARM.

Auxiliary Structure Rim/Recess Comprises Linear PLTCM:

In lieu of or in addition to the auxiliary structure hole comprising the linear PLTCM, an auxiliary structure rim/recess can comprise the linear PLTCM. Here, the rim comprises an inner peripheral surface or the recess lateral boundaries are defined by such inner peripheral surface. In turn, the inner peripheral surface has a first transverse dimension ("major axis") greater than an orthogonally oriented second transverse dimension ("minor axis") in the same plane. A pure rectilinear example of such constitution is a rectangle; a pure curvilinear example of such constitution is a non-circular ellipse; a combination of the two will yield a slot geometry. Of course, the skilled practitioner will appreciate that combinations of these two forms are within the scope of the invention. In such a configuration, the sides of the inner peripheral surface bounding the minor axis comprise the primary reactive surfaces of the linear PLTCM when the minimum dimension between diametrically opposed peripheral surfaces of the dynamic sleeve insert flange portion is nominally less than the minor axis dimension and the peripheral surfaces of the flange portion otherwise has complementary surface characteristics, e.g., planar (any dimension less than nominal will permit multi-axis or planar movement, which is addressed separately below). A benefit of such embodiments is that if the flange portion is anything but circular, then the opposing surfaces of the rim/recess internal peripheral surfaces function as the second part of the second ARM while the complementary surfaces of the flange portion peripheral surfaces constitute the first part of the second ARM. The skilled practitioner will appreciate that various combinations of the above-referenced structures are possible without departing from the scope of the invention and embodiments thereof.

As noted above, the constitution of the PLTCM will determine whether it functions in a linear or planar mode. The previous paragraphs detailed a linear mode PLTCM wherein there was preferably a nominal separation between minor axis surfaces of the auxiliary structure and the dynamic sleeve insert. A planar PLTCM comprises a linear PLTCM but with greater opposing surface boundary differences relative to the dynamic sleeve insert. In other words, the distance between respective dynamic sleeve insert and auxiliary structure PLTCM reactive surfaces is greater in planar PLTCM embodiments than in linear embodiments. As a consequence, there is increased "play" in the minor axis direction, preferably up to the degree of otherwise linear translation.

Finally, planar lateral translation between the dynamic sleeve insert and the auxiliary structure can also be achieved through the use of an intermediate dynamic sleeve insert. In such embodiments, an exemplary form of which is shown in the Description of Invention Embodiments section of this patent, the auxiliary structure comprises the intermediate dynamic sleeve insert, which in turn is disposed in one of a static sleeve insert or a work piece. In such embodiments, two linear PLTCMs are used in conjunction with each other to achieve multi-axis lateral translation. A benefit from using such embodiments is the greater structural integrity afforded by true linear PLTCM embodiments, and the better compressive load distribution afforded by such a configuration.

In certain invention embodiments, the auxiliary structure comprises one of the at least two work pieces. In such embodiments, the hole defined thereby will necessarily have a cross sectional area greater than that of the dynamic sleeve insert to allow for constrained lateral translational movement. Depending upon the embodiment, the hole may comprise the second part of the second ARM, and/or the second part of the PLTCM. In many situations, however, the fabrication costs associated with forming precise hole dimensions and/or the creation of rims/recesses on the surface of such work piece is not cost effective. In such situations, it is therefore beneficial to "rough in" a hole, and establish the desired geometry and tolerances through the use of an insert, much like the sleeve insert disclosed in WO 03/069971. Many system embodiments of the invention provide for a static sleeve insert as the auxiliary structure.

A static sleeve insert according to such embodiments is preferably mechanically anchored, attached, or fastened to one of the at least two work pieces, usually the proximal work piece. The purpose of the static sleeve insert is to create the second part of the second ARM in a work piece where such a structure did not previously exist, and/or the second part of a linear/planar PLTCM. Thus, the features and characteristics of the static sleeve insert second part of the second ARM and/or the second part of the linear/planar PLTCM are the same or similar to those of the more generic auxiliary structure embodiments described above. The exterior features of the static sleeve insert, however, may comprise a smooth cylindrical surface with smooth ends for embodiments wherein, for example, the hole of the static sleeve insert provides the second ARM or PLTCM functionality, or may comprise a peripheral rim and/or form a surface recess wherein, for example, the rim/recess of the static sleeve insert provides the second ARM or PLTCM functionality. Other exterior surface features of the static sleeve insert may relate to increasing the association between it and a work piece, such as the inclusion of a radially extending flange at one end of the static sleeve insert body portion.

In earlier portions of this disclosure, reference was made to temporary relative movement embodiments and permanent relative movement embodiments with respect to the dynamic sleeve insert and the auxiliary structure. The structural and functional difference between the two will now be described. In the case of temporary relative movement embodiments, compression forces generated by a stud engaged with the fastening component disposed in the dynamic sleeve insert during clamp-up are transferred through the work pieces such that all work pieces are in relative compression with each other, and the stud/fastener combination are in tension as is the usual case. In the case of permanent relative movement embodiments, however, at least the proximal work piece (i.e., the work piece most proximate to the location of fastener insertion and/or stud insertion) is non-compressionally held captive by the system embodiments, as will now be described in detail.

Instead of compressive forces generated by a stud engaged with the fastening component disposed in the dynamic sleeve insert during clamp-up being transferred through the work pieces, the most distal work piece (i.e., the work piece most distal from the location of fastener insertion and/or stud insertion) functions as a mechanical ground for a column comprising an auxiliary structure not including the proximal work piece (e.g., the static sleeve insert) and a dynamic sleeve insert. A radially projecting element such as the stud head and/or flange portion of the dynamic sleeve insert is then positioned proximate to but not in compressive contact with the proximal work piece. In such a manner, if the hole in the proximal work piece through which at least the dynamic sleeve insert passes is of greater area than the body portion of the dynamic sleeve insert, then constrained lateral movement is permitted as previously described, and axial movement is constrained by the degree of separation between the work piece and the radially projecting element. This arrangement is particularly adapted for use in dynamic environments wherein at least one work piece is subject to flexing, mechanical or thermal expansion/contraction, or similar modes imparting dynamic movement.

Lastly, for purposes of this patent, the terms "area", "boundary", "part", "portion", "surface", "zone", and their synonyms, equivalents and plural forms, as may be used herein and by way of example, are intended to provide descriptive references or landmarks with respect to the article and/or process being described. These and similar or equivalent terms are not intended, nor should be inferred, to delimit or define per se elements of the referenced article and/or process, unless specifically stated as such or facially clear from the several drawings and/or the context in which the term(s) is/are used.

BRIEF DESCRIPTION OF THE DRAWINGS

FIG. 1 is an exploded perspective view of a first linear PLTCM embodiment of the invention wherein first parts of the second ARM and the PLTCM are located on a cylinder portion of the dynamic sleeve insert and the static sleeve insert has a through hole defined in part by the second parts of the second ARM and the PLTCM, and is adapted to receive and permit axial translation of the dynamic sleeve insert therein;

FIG. 2 is a perspective view of the assembled embodiment of FIG. 1;

FIG. 3 is a bottom perspective view of the embodiment of FIG. 2 wherein the dynamic sleeve insert is shown in a centered position;

FIGS. 4A-C are top plan views of the embodiment of FIG. 2 wherein the dynamic sleeve insert is shown in three distinct linear translation states: lateral left, centered and lateral right;

FIG. 13 is an exploded perspective view of a second planar PLTCM embodiment of the invention wherein first and second dynamic sleeve inserts are concentrically nested in a static sleeve insert, the first insert being constrained to translation in first opposing directions by its interaction with the second dynamic sleeve insert, and the second insert being constrained to translation in first and second direction that are perpendicular to that of the first insert by the static sleeve insert;

DESCRIPTION OF INVENTION EMBODIMENTS

Figure 5:
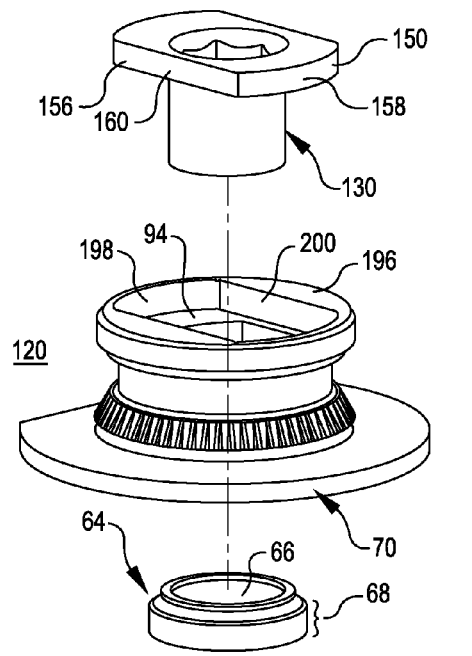
FIG. 5 is an exploded perspective view of a second linear PLTCM embodiment of the invention wherein first parts of the second ARM and the PLTCM are located on are located on a flange portion of the dynamic sleeve insert and the static sleeve insert has a recess defined in part by the second parts of the second ARM and the PLTCM, and wherein a through hole defined by the static sleeve insert is adapted to receive and permit axial translation of the dynamic sleeve insert therein.

Preface: The terminal end of any numeric lead line in the several drawings, when associated with any structure or process, reference or landmark described in this section, is intended to representatively identify and associate such structure or process, reference or landmark with respect to the written description of such object or process. It is not intended, nor should be inferred, to delimit or define per se boundaries of the referenced object or process, unless specifically stated as such or facially clear from the drawings and the context in which the term(s) is/are used. Unless specifically stated as such or facially clear from the several drawings and the context in which the term(s) is/are used, all words and visual aids should be given their common commercial and/or scientific meaning consistent with the context of the disclosure herein.

With the foregoing in mind, the following description is presented to enable a person skilled in the art to make and use the claimed invention. Various modifications to the described embodiments will be readily apparent to those skilled in the art, and the generic principles disclosed herein may be applied to other embodiments and applications thereof without departing from the spirit and scope of the present invention, as defined by the appended claims. Thus, the claimed invention is not intended to nor should be limited to the disclosed and/or described embodiments, but is to be accorded the widest scope consistent with the principles and features disclosed herein.

Turning then to the several embodiments, wherein like numerals indicate like parts, and more particularly to FIGS. 1-4, a first embodiment of a dynamic sleeve insert is shown in combination with a static sleeve insert functioning as an auxiliary structure. In this system embodiment 20, dynamic sleeve insert 30 generally comprises body portion 32, beveled edge 42, outer surface 44, flange portion 50 and end 62; static sleeve insert 70 generally comprises body portion 72, bonding flange 82 and bearing surface 94. Additionally, in this illustrated system, optional collar 64 is shown.

In addition to the general elements identified above, dynamic sleeve insert 30 further comprises inner surface 34, which includes reactive portions 36 that make up a second part of a first two part anti-rotation means (first ARM), and outer surface 44, which includes opposing arcuate portions 46 defining a maximum diameter and reactive portions 48 that make up a first part of a second two part anti-rotation means (second ARM) and define a minimum diameter. In addition, flange portion 50 of dynamic sleeve insert 30 comprises exposed surface 52, which presents to the environment when the sleeve is in use, proximal surface 54, which presents to an auxiliary structure (in this case, static sleeve insert 70), and peripheral surface 56.

In addition to the general elements identified above, static sleeve insert 70 further comprises inner surface 74, which includes opposing arcuate portions 76 defining a maximum diameter as well as opposing reactive portions 78 that make up a second part of the second ARM and define a minimum diameter. Bonding flange 82 comprises knurlings 84, annular recess 86 (which aids in retention when inserted into a compliant work pieces), bonding surface 88, supporting surface 90 and annular recess 92, which receives a portion of collar 64 in the illustrated system.

As particularly apparent from FIG. 1, the second ARM functions through the interaction between reactive surfaces 48 of dynamic sleeve insert 30 and reactive surfaces 78 of static sleeve insert 70 when differential rotation between the two sleeve inserts 30 and 70 is encountered. In general, the form of the second ARM is secondary to its stated function, that is the purposeful limiting of full rotation, however, in the illustrated embodiment, bidirectional translation (shear) between the two sleeve inserts 30 and 70 is permitted. As such, reactive surfaces 48 of dynamic sleeve insert 30 and reactive surfaces 78 of static sleeve insert 70 are generally planar to permit such differential movement. The functional result of this configuration is best shown in FIGS. 4A-4C where dynamic sleeve insert 30 is shown translating from an initial position, through a neutral position, to a final position relative to static sleeve insert 70.

Figure 6:
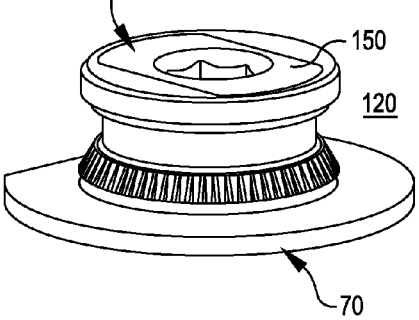
FIG. 6 is a perspective view of the assembled embodiment of FIG. 5.
Figure 7A:
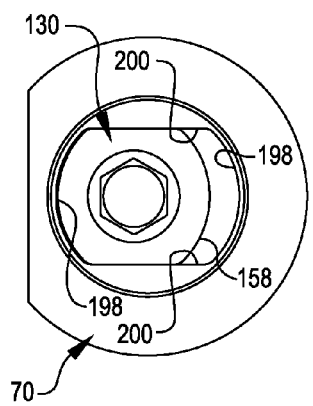
FIGS. 7A-C are top plan views of the embodiment of FIG. 5 wherein the dynamic sleeve insert is shown in three distinct linear lateral translation states: lateral left, centered and lateral right.
Figure 7B:
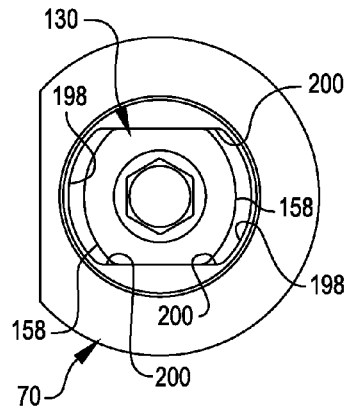
Figure 7C:
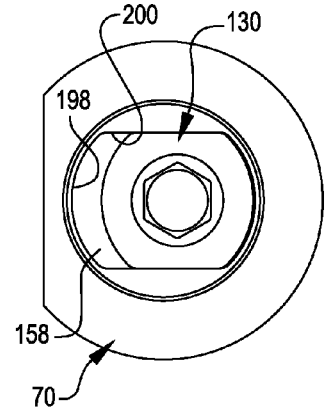

While the previous paragraphs have established the presence of a second ARM through the interaction of surface features associated with the dynamic sleeve insert outer surface and the static sleeve insert inner surface, such a location is neither exclusive nor mandatory. Turning next to FIGS. 5-7, a second embodiment of a dynamic sleeve insert is shown. Except where numerically indicated, all parts, portions, and components of this system 120 embodiment are the same as for system 20. As shown in the referenced figures, flange portion 150 is not circular about its peripheral surface 156, and static sleeve insert 70 further comprises peripheral rim 196 extending from bearing surface 94. Specifically, flange portion 150 includes arcuate portions 158 and reactive surfaces 160 that make up a first part of the second ARM, and peripheral rim 196 includes arcuate portions 198 and reactive surfaces 200 that make up a second part of the second ARM. As best illustrated in FIGS. 7A-7C, differential rotation between dynamic sleeve insert 30 and static sleeve insert 70 is limited by the interaction between reactive surfaces 160 and 200, but the linear geometry of these surfaces permit bi-directional translation there between.

It should be noted that the second ARM implementation shown with respect to system 120 can also occur with respect to bonding flange 82. With particular reference to FIG. 3, supporting surface 90 of bonding flange 82 is shown to define recess 92, which is generally elliptical in geometry. Collar 64 closely fits within the boundaries of this recess, at least in the minor axis constraints of the recess, which therefore allows bi-directional translation of collar 64 (which is securely fastened to dynamic sleeve insert 30) within recess 92, and therefore with respect to static sleeve insert 70. As the skilled practitioner will readily appreciate, surfaces 200 can function as reactive surfaces of a second part of a second ARM while merely creating planar counterpart surfaces to peripheral surface 68 of collar 64 would establish the first part of such second ARM.

Figure 10A:
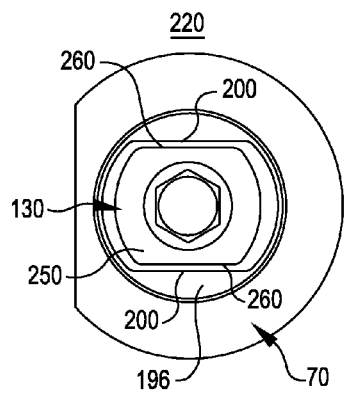
FIGS. 10A-C are top plan views of a first planar PLTCM embodiment wherein the dynamic sleeve insert is shown in three distinct lateral translation states: centered, centered and rotationally engaged and diagonal right.
Figure 10B:
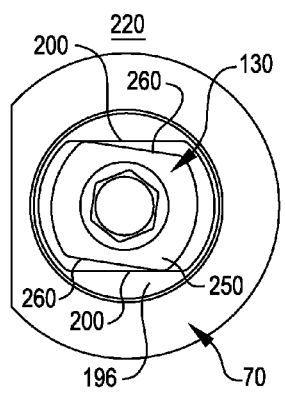
Figure 10C:
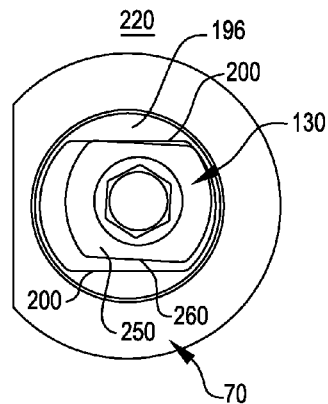

Heretofore, the reactive surfaces of the second ARM have been in close proximity to each other. As a consequence, shear movement between the dynamic sleeve insert and static sleeve insert has generally been constrained to a single line. However, there are applications where such constraints are not desirable. In such situations, the spatial relationship between reactive surfaces need not be as close, which therefore yields planar, as opposed to linear, relative movement. Such an embodiment and system is shown in FIGS. 10-12.

Except where numerically indicated, all parts, portions, and components of this system 220 embodiment are the same as for system 120. As shown in the referenced figures, the distance between opposing reactive surfaces 260 of flange portion 250 is less than opposing reactive surfaces 160 of flange portion 150, while the distance between opposing reactive surfaces 200 of peripheral rim 196 remains the same. As a consequence, relative planar movement (shear) between flange portion 250 and rim portion 196 in a direction perpendicular to the previous direction of reciprocation (e.g., FIGS. 7A-7C) is possible, as well as any direction within the plane there between (see, FIG. 10C). Relative rotational movement there between is still affected by the presence of the second ARM, although more than nominal rotation is permitted (see, FIG. 10B).

Figure 8A:
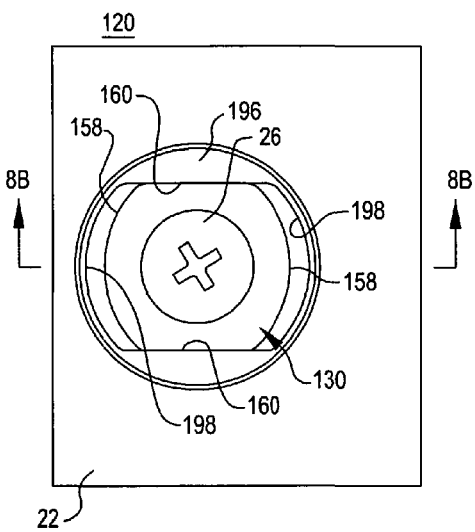
FIG. 8A is a plan view similar to that of FIG. 7A and additionally comprising an inserted fastener system comprising a stud and collet, and associated work pieces.
Figure 8B:
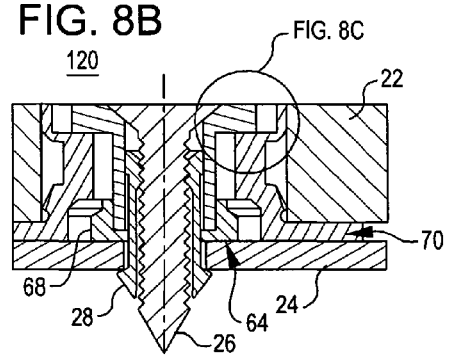
FIG. 8B is a cross section of the embodiment of FIG. 8A taken substantially along the line 8B-8B.
Figure 8C:
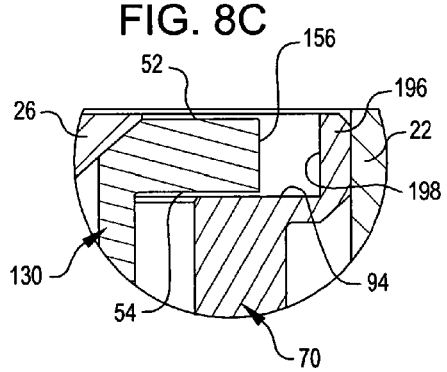
FIG. 8C is a detailed cross section of the nominal axial separation between the dynamic sleeve insert and the static sleeve insert shown in FIG. 8B.
Figure 9A:
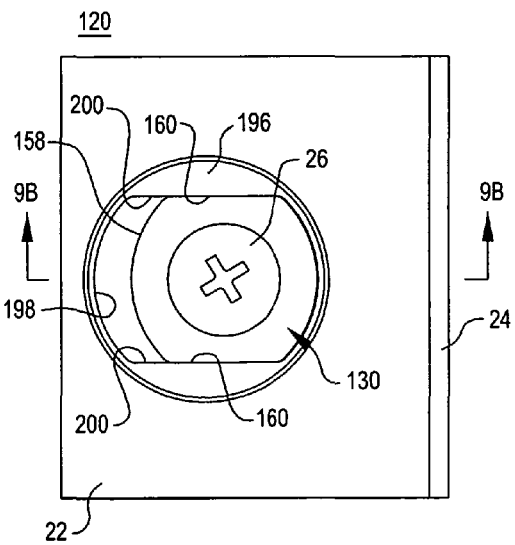
FIG. 9A is a plan view similar to that of FIG. 7C and additionally comprising an inserted fastener system comprising a stud and collet, and associated work pieces.
Figure 9B:
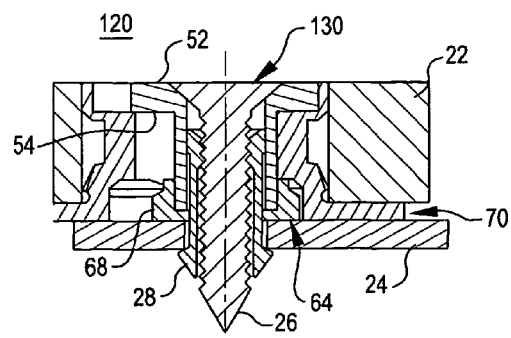
FIG. 9B is a cross section of the embodiment of FIG. 9A taken substantially along the line 9B-9B.
Figure 11A:
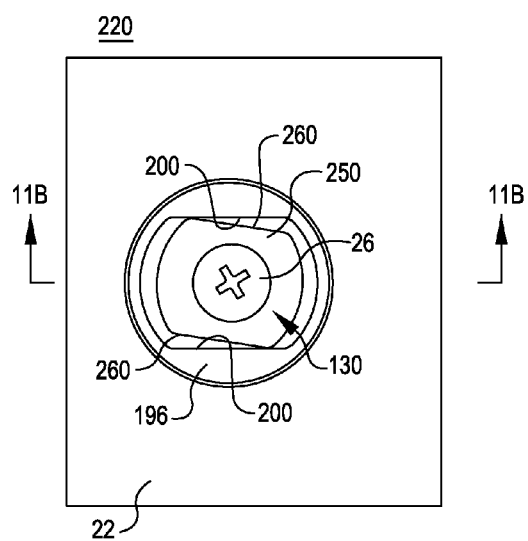
FIG. 11A is a plan view similar to that of FIG. 10B and additionally comprising an inserted fastener system comprising a stud and collet, and associated work pieces.
Figure 11B:
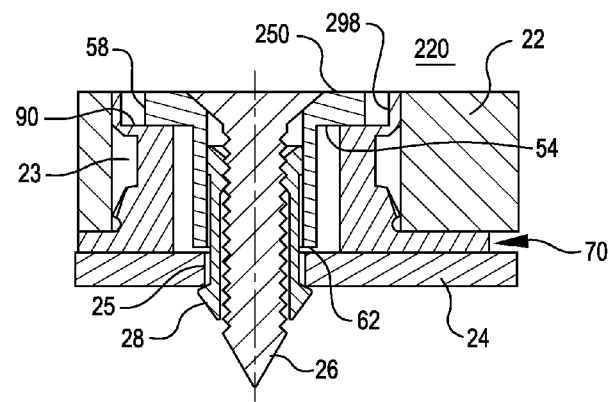
FIG. 11B is a cross section of the embodiment of FIG. 11A taken substantially along the line 11B-11B.
Figure 12A:
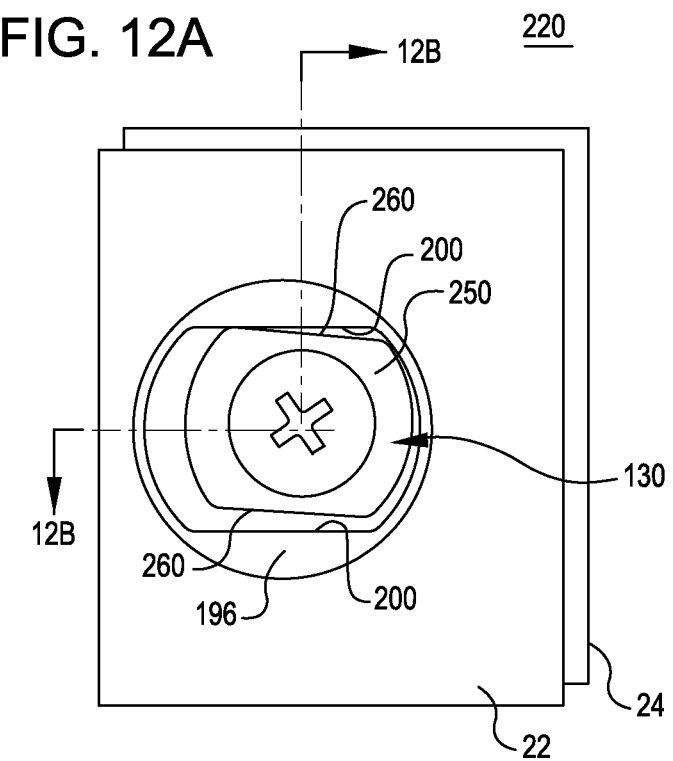
FIG. 12A is a plan view similar to that of FIG. 10C and additionally comprising an inserted fastener system comprising a stud and collet, and associated work pieces.
Figure 12B:
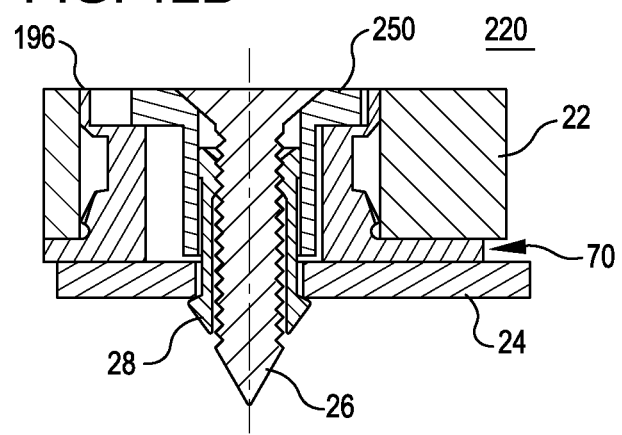
FIG. 12B is a cross section of the embodiment of FIG. 12A taken substantially along the line 12B-12B.

When system 220 is used in conjunction with several work pieces, the state is best illustrated in FIGS. 11 and 12. FIGS. 11A and 11B correlate with the condition shown in FIG. 10B, while FIGS. 12A and 12B correlate with the condition shown in FIG. 10C. As was the case with FIGS. 8 and 9, collet body 28 is directly engaged with dynamic sleeve insert 130 and indirectly with structure 24. FIGS. 11A and 11B represent a nominal clamp-up between panel 22 and structure 24: bore 23 of panel 22 is coaxial with bore 25 of structure 24, and panel 22 and structure 24 have exposed edge registry (see left side of figure). FIG. 11B particularly shows the symmetry of space between arcuate portions 98 of static sleeve insert 70, and arcuate portions 158 of dynamic sleeve insert 130, which is indicative of coaxial alignment of the bores. Also with respect to FIG. 11B and unlike FIG. 8, dynamic sleeve insert 130 is in compressive contact via proximal surface 54 of flange portion 250 with supporting surface 90 of static sleeve insert 70, and that end 62 is in a spaced apart relationship with structure 24. Thus, in this embodiment relative movement between panel 22 and structure 24 is not intended when full clamp-up is achieved; the intention is to provide means for accommodating non-coaxial bore alignment as shown in FIGS. 12A and 12B and discussed below.

FIG. 11A particularly illustrates an engaged state for the second ARM (both reactive surfaces 260 are contacting opposing reactive surfaces 200). However, because of the reduced distance between reactive surfaces 260, the second ARM is in a predominantly point load configuration as opposed to a more distributed surface load configuration (compare to FIG. 8A). Regardless of this difference, the two ARMs are functionally equivalent in the broad sense that they both prevent unrestricted differential rotation between dynamic sleeve insert 130 and static sleeve insert 70. If load values and/or creep are considered material factors in ARM selection, the areas of point load can be increased by modifying the surface characteristics of the reactive surfaces.

While the alignment between bore 23 of panel 22 and bore 25 of structure 24 was considered ideal in FIGS. 11A and 11B, bore alignment in FIGS. 12A and 12B is offset (there is a shift of structure 24 to the right relative to panel 22, which causes non-coaxial alignment of the two bores 23 and 25). In order to accommodate such misalignment, dynamic sleeve insert 130 is permitted to occupy an offset position (no axial symmetry) within static sleeve insert 70, as is particularly shown in FIG. 12B. In this figure, the displacement of dynamic sleeve insert 130 within the area bounded by peripheral rim 196 is apparent, as was the case in FIG. 9B. Thus, even while dynamic sleeve insert 130 has been multidirectionally displaced within static sleeve insert 70, the second ARM continues to function and sufficient compressive contact continues to exist between dynamic sleeve insert 130 and static sleeve insert 70.

Figure 14A:
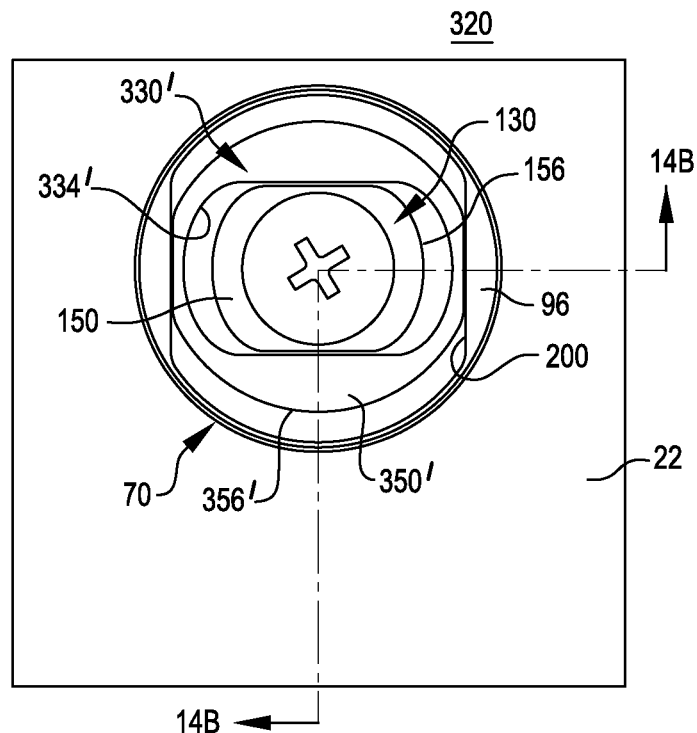
FIG. 14A is a plan view of the assembly shown in FIG. 13 and additionally comprising an inserted fastener system comprising a stud and collet, and associated work pieces wherein the stud and dynamic sleeve inserts are shown in a central position.
Figure 14B:
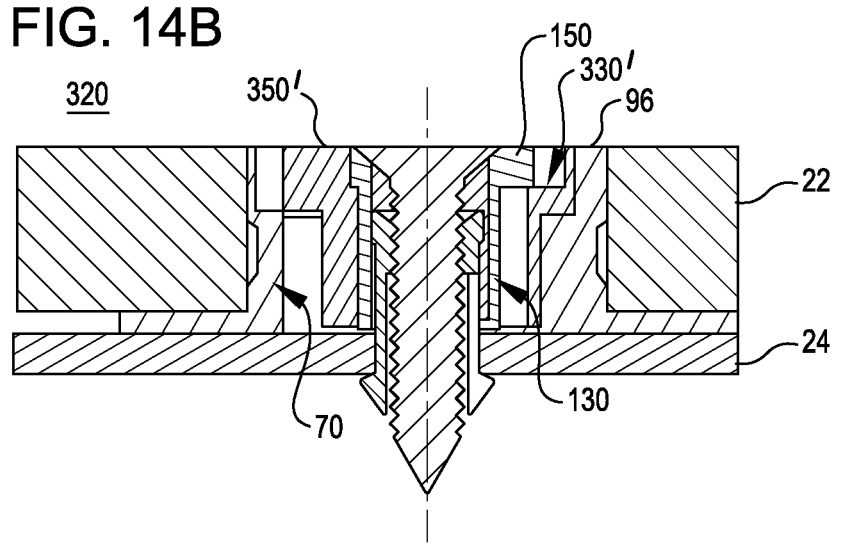
FIG. 14B is a compound cross section of the embodiment of FIG. 14A taken substantially along the line 14B-14B.
Figure 15A:
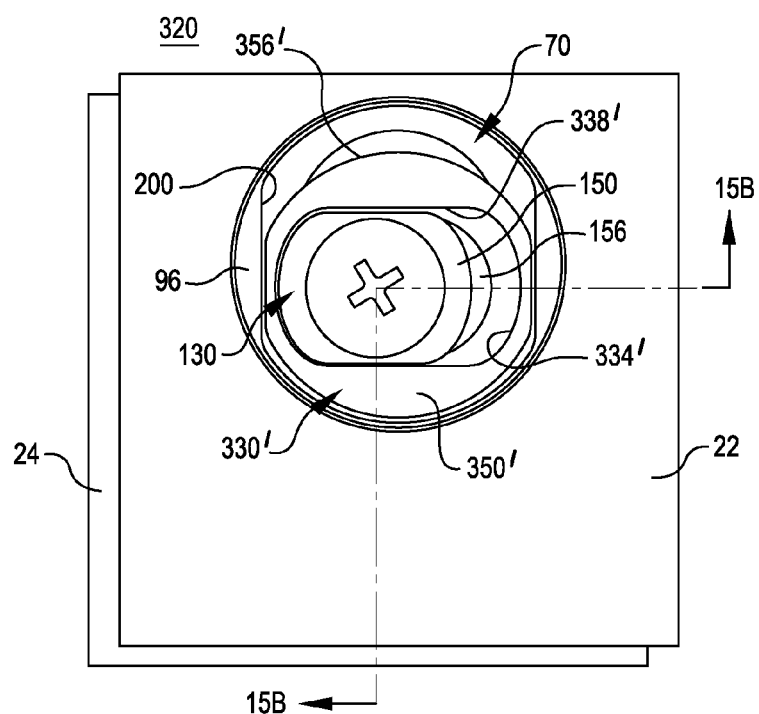
FIG. 15A is a plan view of the assembly shown in FIG. 13 and additionally comprising an inserted fastener system comprising a stud and collet, and associated work pieces wherein the stud and dynamic sleeve inserts are shown in an off center position.
Figure 15B:
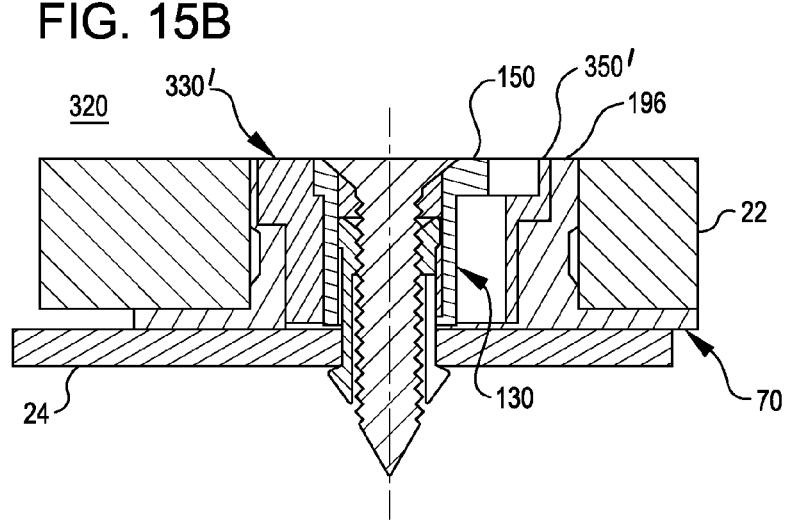
FIG. 15B is a compound cross section of the embodiment of FIG. 15A taken substantially along the line 15B-15B.

While the system shown in FIGS. 12A and 12B can address multiple vector displacement scenarios, system 320 shown in FIGS. 13-15 provides a more robust solution. Here, except for dimensional differences, dynamic sleeve insert 130 and static sleeve insert 70 remain generally consistent with other system and component embodiments previously described. The primary distinction between this system and other system embodiments concerns the inclusion of secondary dynamic sleeve insert 330' and the inclusion/distribution of a third ARM.

Dynamic sleeve insert 130 is generally similar in geometry and function to dynamic sleeve insert 130 found in other figures, however, the second part of the second ARM, to which reactive surfaces 160 are complementary, is found instead on dynamic sleeve insert 330' as opposed to the static sleeve insert. Dynamic sleeve insert 330' therefore comprises the second part of the second ARM, and additionally comprises a first part of a third ARM. Given its necessary interaction with dynamic sleeve insert 330', static sleeve insert 70 therefore comprises the second part of the third ARM (as opposed to the second part of the second ARM, as in previous embodiments), although the means of operation of the third ARM is essentially the same.

Each sleeve insert of system 320 relies upon flange-based and rim-based reactive structures to function as the various ARMs. Thus, flange portion 150 of dynamic sleeve insert 130 includes peripheral surface 156 having reactive surfaces 160 as the first part of the second ARM, while flange portion 350' of dynamic sleeve insert 330' includes peripheral rim 334' having reactive surfaces 338' as the second part of the second ARM. The third ARM is comprised of reactive surfaces 360' of dynamic sleeve insert 330''s peripheral surface 356' as the first part, and reactive surfaces 200 of rim portion 96 as the second part. In the illustrated system, each of the second and third ARM is constrained to reciprocating linear motion, however, because the two ARMs are mechanically linked, the net effect is that dynamic sleeve insert 130 is capable of unrestricted planar (shear) movement relative to static sleeve insert 70, or as best illustrated in FIGS. 14A-B and 15A-B, relative to panel 22, to which static sleeve insert 70 is bonded.

What is claimed:

1. A dynamic sleeve insert for non-destructive association of at least a first and a second work piece in combination with a fastener comprising a first part of a first, two-part anti-rotation component, the dynamic sleeve insert comprising:
- a body portion having an outer surface including a first end, a second end, and an inner surface, the outer surface including opposing reactive portions that are planar and opposing non-planar portions, where the opposing non-planar portions are complementary with and spaced away from opposing non-planar portions in an auxiliary structure;
- a second part of the first, two-part anti-rotation component defined by the inner surface, the inner surface further defining a bore and an axis of translation; and
- a first part of a second, two-part anti-rotation component defined by the outer surface, wherein the inner surface accommodates substantial axial translation of the first part of the first, two-part anti-rotation component, and wherein the first part of the second, two-part anti-rotation component is functionally complementary to the auxiliary structure comprising a second part of the second, two-part anti-rotation component, whereby greater than nominal shear movement between the dynamic sleeve insert and the auxiliary structure in a plane generally orthogonally oriented to the axis of translation is accommodated prior to final association with or between the at least first and second work pieces.

2. The dynamic sleeve insert of claim 1, whereby the greater than nominal shear movement between the dynamic sleeve insert and the auxiliary structure in the plane generally orthogonally oriented to the axis of translation is accommodated prior to and after final association with or between the at least first and second work pieces.

3. The dynamic sleeve insert of claim 2, wherein the shear movement between the dynamic sleeve insert and the auxiliary structure is substantially exclusively bidirectional.

4. The dynamic sleeve insert of claim 1, wherein the auxiliary structure is a work piece, a static sleeve insert, or a second dynamic sleeve insert.

5. The dynamic sleeve insert of claim 1, wherein the auxiliary structure is a static sleeve insert.

6. The dynamic sleeve insert of claim 1, wherein the shear movement between the dynamic sleeve insert and the auxiliary structure is substantially exclusively bidirectional.

7. The dynamic sleeve insert of claim 5, wherein the first part of the second, two-part anti-rotation component comprises a planar surface generally parallel to the bidirectional translation or shear movement between the dynamic sleeve insert and the auxiliary structure.

8. The dynamic sleeve insert of claim 1, further comprising an anti-translation component for limiting axial translation of the dynamic sleeve insert with respect to the auxiliary structure.

9. The dynamic sleeve insert of claim 1, wherein the first part of the second, two-part anti-rotation component comprises a flange portion.

10. A system for non-destructive association of at least a first and a second work piece in combination with a fastener comprising a first part of a first, two-part anti-rotation component, the system comprising:
- a first dynamic sleeve insert comprising a body portion having an outer surface including a second end, and an inner surface, a second part of the first, two-part anti-rotation component defined by the inner surface, the inner surface further defining a bore and an axis of translation, and a first part of a second, two-part anti-rotation component defined by the outer surface, wherein the inner surface accommodates substantial axial translation of the first part of the first, two-part anti-rotation component, the outer surface including opposing arcuate portions and opposing reactive portions that are planar, the opposing arcuate portions complementary with and spaced away from opposing arcuate portions in a static sleeve insert; and
- where the static sleeve insert receives at least a portion of the first dynamic sleeve insert and has an outer surface bounded by a first end and a second end, and an inner surface defining a bore, the static sleeve insert further comprising a second part of the second, two-part anti-rotation component defined by the inner surface, whereby greater than nominal shear movement between the first dynamic sleeve insert and the static sleeve insert in a plane generally orthogonally oriented to the axis of translation is accommodated after insertion of the first dynamic sleeve insert into the static sleeve insert.

11. The system of claim 10, wherein the shear movement between the first dynamic sleeve insert and the static sleeve insert is substantially exclusively bidirectional.

12. The system of claim 11, wherein the first part of the second, two-part anti-rotation component comprises a planar surface generally parallel to the bidirectional translation or shear movement between the first dynamic sleeve insert and the static sleeve insert.

13. The system of claim 12, further comprising a second dynamic sleeve insert having a body portion including an outer surface bounded by a first end and a second end, and an inner surface defining a bore, wherein the bore of the second dynamic sleeve insert is configured to receive at least a portion of the first dynamic sleeve insert, and comprises a first part of a third, two-part anti-rotation component defined by the outer surface; and
- wherein the static sleeve insert is configured to receive at least a portion of the second dynamic sleeve insert and comprises a second part of the third, two-part anti-rotation component defined by the inner surface, whereby greater than nominal shear movement between the second dynamic sleeve insert and the static sleeve insert in the plane generally orthogonally oriented to the axis of translation is accommodated after insertion of the first dynamic sleeve insert into the second dynamic sleeve insert and insertion of the second dynamic sleeve insert into the static sleeve insert.

14. The system of claim 13, wherein the first part of the third, two-part anti-rotation component comprises a planar surface generally parallel to a bidirectional shear movement between the second dynamic sleeve insert and the static sleeve insert.

15. The system of claim 14, wherein the second part of the third, two-part anti-rotation component comprises a planar surface generally parallel to the bidirectional shear movement between the second dynamic sleeve insert and the static sleeve insert.

16. The system of claim 11, wherein the second part of the second, two-part anti-rotation component comprises a planar surface generally parallel to the bidirectional translation or shear movement between the first dynamic sleeve insert and the static sleeve insert.

17. The system of claim 16, further comprising a second dynamic sleeve insert having a body portion including an outer surface bounded by a first end and a second end, and an inner surface defining a bore, wherein the bore of the second dynamic sleeve insert is configured to receive at least a portion of the first dynamic sleeve insert, and comprises a first part of a third, two-part anti-rotation component defined by the outer surface; and wherein the static sleeve insert is configured to receive at least a portion of the second dynamic sleeve insert and comprises a second part of the third, two-part anti-rotation component defined by the inner surface, whereby greater than nominal shear movement between the second dynamic sleeve insert and the static sleeve insert in the plane generally orthogonally oriented to the axis of translation is accommodated after insertion of the first dynamic sleeve insert into the second dynamic sleeve insert and insertion of the second dynamic sleeve insert into the static sleeve insert.

18. The system of claim 17, wherein the first part of the third, two-part anti-rotation component comprises a planar surface generally parallel to a bidirectional shear movement between the second dynamic sleeve insert and the static sleeve insert.

19. The system of claim 18, wherein the second part of the third, two-part anti-rotation component comprises a planar surface generally parallel to the bidirectional shear movement between the second dynamic sleeve insert and the static sleeve insert.

20. The system of claim 11, further comprising a second dynamic sleeve insert having a body portion including an outer surface bounded by a first end and a second end, and an inner surface defining a bore, wherein the bore of the second dynamic sleeve insert is configured to receive at least a portion of the first dynamic sleeve insert and comprises a first part of a third, two-part anti-rotation component defined by the outer surface of the second dynamic sleeve insert; and wherein the static sleeve insert is configured to receive at least a portion of the second dynamic sleeve insert and comprises a second part of the third, two-part anti-rotation component defined by the inner surface, whereby the greater than nominal shear movement between the second dynamic sleeve insert and the static sleeve insert in the plane generally orthogonally oriented to the axis of translation is accommodated after insertion of the first dynamic sleeve insert into the second dynamic sleeve insert and insertion of the second dynamic sleeve insert into the static sleeve insert.

21. The system of claim 20, wherein the first part of the third, two-part anti-rotation component comprises a planar surface generally parallel to a bidirectional shear movement between the second dynamic sleeve insert and the static sleeve insert.

22. The system of claim 21, wherein the second part of the third, two-part anti-rotation component comprises a planar surface generally parallel to the bidirectional shear movement between the second dynamic sleeve insert and the static sleeve insert.

* * * * *